Oct. 29, 1957 R. E. THOMPSON 2,811,045

CONTROL APPARATUS

Filed March 24, 1955

INVENTOR.
Reynald E. Thompson
BY
Mueller & Aichele
Atty's.

2,811,045

CONTROL APPARATUS

Reynald E. Thompson, Mount Prospect, Ill., assignor to Motorola, Inc., Chicago, Ill., a corporation of Illinois Application March 24, 1955, Serial No. 496,463

5 Claims. (Cl. 74—10.33)

This invention relates generally to push button controls, and more particularly to mechanisms providing push button and manual adjustment of movable elements such as tuners of wave signal receivers. Many devices in use today incorporate a push-button system to permit rapid and convenient selection of certain positions or operations. One main example is radio receivers, and particularly auto receivers. It is usual for such receivers to include a manually operated tuning knob also so that wave lengths for which there are no push buttons may be selected. However, generally the push button mechanism operates the same variable tuning elements of the radio as does the tuning knob and a common provision of tuners is the incorporation of disengageable mechanism so that the tuning knob is freed when a push button is operated to select a station. Therefore, as the tuner is operated through push button control, the tuning knob will not rotate to cause possible inconvenience of the operator. Furthermore, increased load from the structure incorporated with the tuning knob will not be introduced into the system so that the buttons will be hard to press. In fact, the gear reducing apparatus used with some manual tuning knobs to facilitate fine tuning, renders movement of the tuning elements of the receiver by other than the knob itself difficult or impossible.

One objection to push button tuners is that a push button, when being operated, presents rather sharp changes in mechanical resistance to the operator thereof. This is largely caused by the fact that the disengageable mechanisms used do not provide uniform or gradual change in mechanical resistance. That is, a cycle of operation might consist of medium resistance while the tuning knob is freed, followed by an increase in resistance as the tuning elements are adjusted, during which period a sharp decrease in resistance may occur as the disengageable mechanism for the tuning knob presents little or no restraining force.

Accordingly, it is an object of the present invention to provide push button apparatus which overcomes such difficulty and furnishes automatic disengagement of a manually operated continuously variable knob by smoothly functioning mechanism to present an improved feel to an operator of the equipment.

Another object is to provide push button mechanism for radio signal tuners which presents a gradually changing resistance during operation thereof with no sudden increase or decrease in the mechanical resistance presented over the complete range of movement of a button.

A feature of the invention is the provision of push button operated apparatus with disengaging mechanism for a manually operated knob and including a slidable spring biased release plate for operating the disengaging mechanism, with the release plate having arcuate surfaces engaged by the push button plunger rods so that sudden resistance changes are not experienced by the rods.

Another feature of the invention is the provision of a slidable plate member operated by a plunger and push button of tuning apparatus with the plate joined by a resilient linkage to disengaging mechanism for a manual tuning knob in the tuning apparatus so that the mechanical load is applied gradually in operating the push button.

Other objects, features and the attending advantages thereof will be apparent upon consideration of the following description of a specific embodiment of the invention when taken in conjunction with the accompanying drawing in which.

Figure 1:
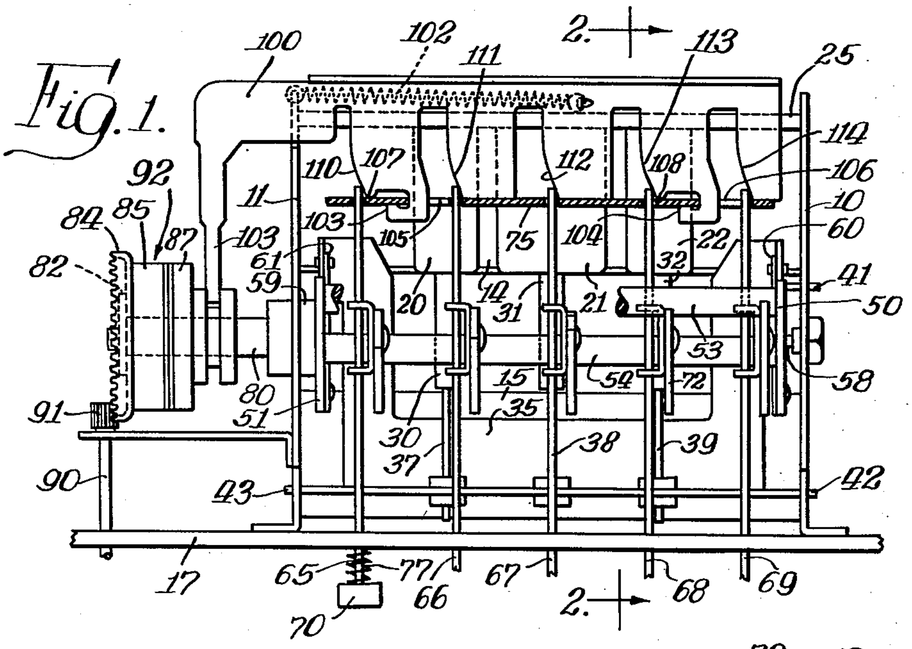
Fig. 1 is a plan view of wave signal tuning apparaus employing the invention.

The present invention includes mechanism for control of apparatus such as one or more resonant circuits in a wave signal receiver by means of a manually rotatable knob and a series of push buttons, each for quickly and conveniently selecting a certain predetermined setting of the resonant circuits, for selecting a given frequency. Each push button is coupled to disengaging mechanism for freeing the rotatable knob as a button is operated so that undesirable mechanical loading will not be introduced into the system from the tuning knob and any gearing mechanism associated therewith. The push buttons control slidably mounted rods or plungers to which are fastened cam members adapted to engage an adjustable treadle connected to the resonant circuits so that movement of a rod brings into engagement its associated cam and the treadle for tuning. The rotatable tuning knob is also coupled to the treadle by means of disengageable mechanism which is spring biased to be normally closed so that general, continuous tuning of the resonant circuits may be accomplished by manual operation of the knob. End portions of the slidably mounted plungers are adapted to engage cam sections having inclined and arcuate portions along the edge of a slidably mounted release plate so that as a plunger is moved into engagement therewith, and before the cam engages the treadle for tuning purposes, the plate is displaced and an arm member secured thereto may cause freeing of the tuning knob through operation of the disengaging mechanism. The cam sections of the plate are curved to provide continuous smooth response and gradual change in mechanical resistance as presented to an operator. Further improvement in the apparatus is provided through attachment of the arm member to the slidable plate by resilient means in order to provide gradual application of the mechanical load of the apparatus during operation.

Considering now the drawing and the embodiment of the invention illustrated, it may be seen that the tuner apparatus includes a frame having end plates 10 and 11 and bottom plates 14 and 15. The frame may be secured to a panel 17 in any desired manner. Inductor units 20, 21 and 22, which may be used in the resonant circuits of an associated radio receiver, are supported by means of plate member 25 which is secured to bottom plate 14. The units 20–22 may be tuned by means of their associated tuning slugs 30–32, respectively. Such tuning slugs are well known in the art and positioning these to a greater or lesser extent within the associated inductor units may be used to provide selection of the signal to be reproduced by the associated radio receiver (not shown). Inductor units 20–22 may be associated with stages in a super-heterodyned receiver such as the radio frequency amplifier stage, the mixer stage and the oscillator stage. Tuning slugs 30–32 are connected to a slidably mounted carriage 35 by means of threaded rods 37, 38 (not shown) and 39. Threaded rods 37–39 are secured to carriage 35 by means of suitably tapped supports so that each tuning slug may be adjusted with respect to the other for purposes of aligning the resonant circuits as is familiar to those in the art. Carriage 35 includes guide lugs 41, 42 and 43 which are supported in slots formed in end plates 10 and 11 so that tuning slugs 30–33 may all be adjusted simultaneously as carriage 35 is moved reciprocally.

The rotatably mounted treadle consisting of end plates 50 and 51 joined by parallel shafts 53 and 54 is supported within the frame of the tuning apparatus by means of bearings 58 and 59. These bearings support the treadle bar so that the same may rotate about a point midway between the parallel shafts 53 and 54. End plates 50 and 51 of the treadle bar are connected to slidable carriage 35 by means of link members 60 and 61, respectively. The end plates 50 and 51 are joined to their associated link members at points remote from the parallel shafts 53 and 54 and it is apparent that rotation of the treadle bar will cause slidable movement of the carriage 55 and thus permit tuning of a radio receiver.

Figures 2, 3, 4:
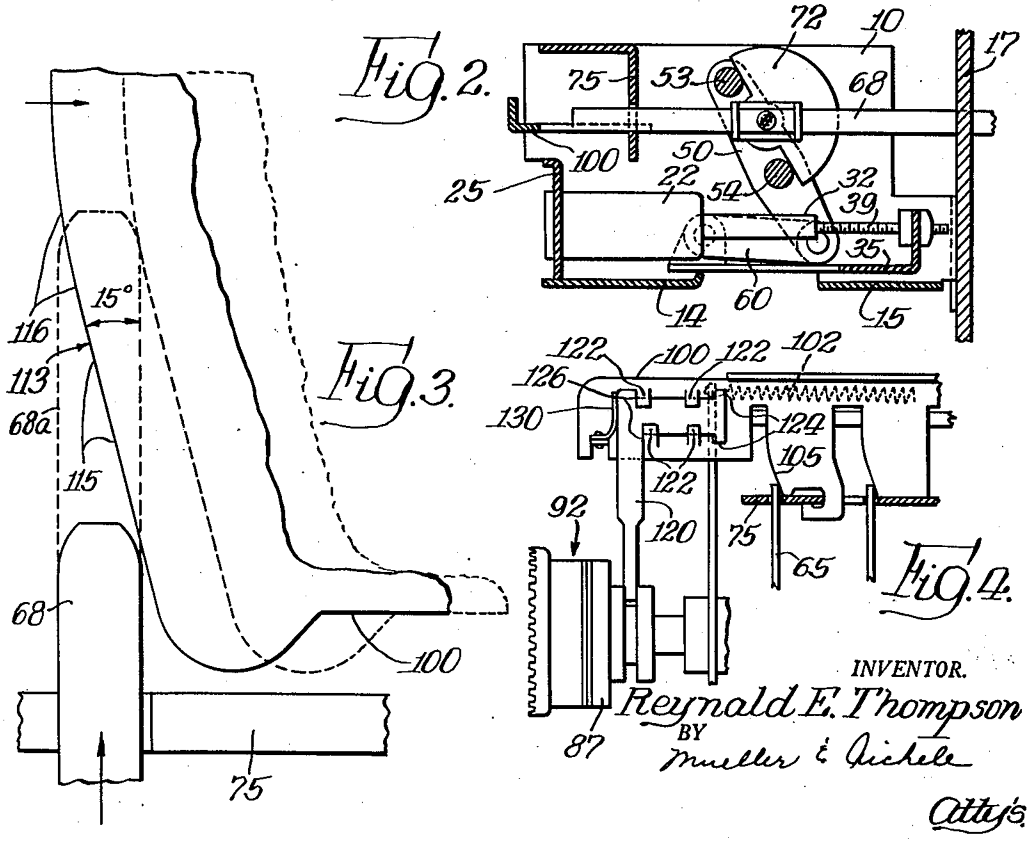
Fig. 2 is a view along the lines 2—2 of Fig. 1 with the apparatus in operated condition.
Fig. 3 is an enlarged view of a portion of the tuning apparatus.
Fig. 4 is a plan view of a portion of tuning apparatus with an improved linkage system.

In order to effect tuning to fixed preselected frequencies, the push rods or plungers 65–69 are provided. Any one of these may be actuated by pushing a suitable button such as button 70 shown secured to plunger 65. Each plunger has secured thereto an associated cam plate such as cam plate 72 secured to plunger 68 (Fig. 2). The plungers are supported by means of apertures in panel 17 and apertures in bracket 75 so there can be reciprocating travel of a plunger as it is moved along a line passing through the bearings 58 and 59 for the treadle bar. Fig. 2 shows plunger 68 at its operated position, that is, pushed inward to the limit of its travel, thus bringing the cam plate 72 into engagement with the shafts 53 and 54 as one edge of the cam plate engages both of these shafts. As is apparent, if the treadle bar is not in this aligned position when plunger 68 is operated, it will be forced into the position shown by means of the cam plate 72. Thus, tuning to the frequency corresponding to the position of the apparatus as shown may be had. Other cam plates secured to the other plungers may be fixed with their edges at different angles so that other frequencies may be tuned by operation of these plungers. A suitable spring, such as spring 77, is used to return the plungers to their unoperated positions.

In order to tune to frequencies other than those corresponding to the settings provided by the plungers, continuously variable tuning mechanism is also provided. A shaft 80 secured to treadle bar end plate 51 is extended beyond bearing 59 with a friction disc 82 secured to the end thereof (Fig. 1). Rotatably supported on shaft 80 is a gear 84 fastened to a friction plate 85. A friction plate 87 is also rotatably mounted upon shaft 80 adjacent to plate 85 so that suitable spring biasing of friction plate 87 may secure gear 84 and plate 85 between plates 82 and 87 so that they rotate with shaft 80. A tuning shaft 90 is supported with an end portion extending beyond panel 17 while another section of this shaft supports a cog 91 which is engageable with gear 80. Therefore, it may be seen that a suitable tuning knob (not shown) secured to shaft 90 may be used to effect rotation of the treadle bar to any desired position for tuning purposes and that a desirable vernier adjustment is provided by gear 84 and cog 91. The various friction plates 82, 85, and 87 mounted on shaft 80 constitute disengaging mechanism 92.

It should be apparent that with such a geared tuning arrangement, operation of one of the plungers for push button tuning would be greatly hampered if gear 84 remained meshed with the cog 91 so as to tend to drive shaft 90. Therefore, the disengaging mechanism 92 is constructed to automatically free gear 84 and its associated friction disc 85 when a plunger is operated.

In the normal condition of the apparatus, release plate 100 is spring biased by means of spring 102 toward the left in Fig. 1 and arm 103 secured to release plate 100 engages an annular groove in friction disc 87 to maintain the disengageable mechanism 92, consisting of friction discs 82, 85 and 87 and gear 84 in a closed position where the tuning of shaft 90 allows adjustment of the apparatus.

Release plate 100 is slidably mounted with respect to bracket 75 by means of hooked portions 103 and 104 extending through respective slots 105 and 106 in bracket 75 and bearing points 107 and 108 which bear upon bracket 75 on the side opposite to that which hooked portions 104 and 105 bear. Therefore, release plate 100 may slide a limited amount in a direction perpendicular to the plungers and parallel to the shaft 80. The respective plungers 65–69 are in alignment with the edge of release plate 100 and with cam surfaces 110–114, respectively. Therefore, operation of one of the plungers, the end of which would engage an associated cam surface of release plate 100, would cause slidable movement of plate 100 to the right in Fig. 1 against spring 102 to open the disengageable mechanism 92 and free gear 84. Also, the cam plate associated with the operated plunger would engage the treadle bar and shafts 53 and 54 to tune the apparatus to the chosen frequency without tending to cause rotation of shaft 90 and its associated tuning knob, which would make operation very difficult in working against the reduction gear vernier arrangement.

Referring now to Fig. 3, there is shown the end portion of plunger **68*a* adjacent cam surface 113 which consists of a straight portion 115 at an angle of substantially 15° to the plunger smoothly blending into a rounded or arcuate portion 116. The dotted position 68*a* of the plunger illustrates the maximum displacement of this plunger and that the engagement of the end thereof with the cam surface 108 progresses from contact with the straight portion 115 to the arcuate portion 116. Therefore, the arm 103 (Fig. 1) will be moved to open the disengaging mechanism 92 as the plunger engages the straight portion of the cam section, but the plunger will remain in contact with a rounded portion of the cam section upon further movement. Thus, the effect of the spring biasing of release plate 100 caused by spring 102** will maintain a force upon the plunger without sudden changes therein. It may be seen that even though the disengageable mechanism has been opened, a resistance to movement of the plunger will be maintained as it engages the arcuate portion of the cam section thus providing a more uniform feel during operation of a plunger rod.

Fig. 4 shows a construction of the tuner apparatus in order to provide a more gradual resistance change to the touch in the operation of a push button during the initial travel of the plunger. In this construction, the arm 120, which operatively engages friction disc 87 to open the disengageable mechanism 92 when the release plate 100 is moved to the right, is secured to plate 100 by structure providing some resilience between the plate and the arm. The arm 120 is secured to the release plate 100 by means of a track formed on the plate through upturned lugs 122. However, slidable movement of arm 120 with respect to plate 100 is limited within this track by means of the ears 124 and the portions 126 of the arm which provide stops against the upturned lugs. The closed position of disengaging mechanism 92, as shown in Fig. 4, is maintained by spring 102 drawing lugs 122 against portions 126 of arm 120. However, as release plate 100 is displaced to the right through operation of a plunger, arm 120 will tend to follow this travel since the movement will be imparted thereto through the spring member 130. Enough force may bring ears 124 into contact with lugs 122 to provide a positive connection. It is apparent that the resistance to opening of the disengageable mechanism which forms a load on the push button will, in the main, be applied to the plunger through spring 130 and release plate 100 in a gradual manner and any tendency for sudden change in this resistance will be absorbed in the spring member 130. Therefore, during operation of a plunger, resistance to the force applied will be presented as a gradual increasing one to a point where the disengageable mechanism 92 has opened, after which the positioning of the treadle bar occurs for tuning of the apparatus, while resistance to further plunger motion is maintained by engagement of the end thereof with the arcuate portion of the cam section on the edge of the spring biased release plate 100.

It is clear that the present invention, therefore, provides an improved push button operated system suitable for use with radio tuning apparatus in which there is smooth operation of the plungers. By means of the system described, station selection may be had in a receiver by push-type rods which exhibit no sudden increase or decrease in the mechanical resistance presented to an operator throughout the stroke of the plunger as it is manipulated. As is apparent, the system may also be used in other applications similar to the one shown and described.

What is claimed is:

1. In selector apparatus of the type having a slidably mounted actuator rod with a free end section, the rod being slidable from an initial position to a final position for adjusting mechanical elements to predetermined positions, and variable means interconnected to the mechanical elements through disengageable mechanism spring biased to a normally closed position, an actuating device for such disengageable mechanism including a slidably mounted member with a mechanical link adapted to open the mechanism upon sliding travel thereof, said mechanical link comprising an arm secured to said member by resilient means providing resistance during sliding travel of said member to operate the mechanism to absorb the mechanical load upon opening of the disengageable mechanism, said member further having a cam portion comprising an inclined section smoothly blending into and terminating in an arcuate section, said cam portion being positioned with respect to the free end section of the actuator rod so that the end section engages said inclined section in the initial position and said arcuate section in the final position whereby the spring biasing of the disengageable mechanism is imparted to the actuator rod as the same is moved between said initial and final positions thereof.

2. In wave signal tuning apparatus of the type having movable carriage means for adjusting an associated resonant device and manually operable tuning means coupled by gear reduction means to the carriage means through disengageable mechanism spring biased to a closed position, the push button tuning structure for such apparatus including in combination a slidably mounted plate member adapted to open the disengageable mechanism upon slidable movement thereof, said plate member having a cam section along an edge thereof comprising an inclined portion and an arcuate portion, and a slidably mounted actuator rod having an end in acute angular alignment with said inclined portion of said cam section, said actuator rod being adapted to operate the carriage means upon slidable movement thereof and being slidable from an initial position of engagement with said inclined portion of said cam section to a final position of engagement with said arcuate portion thereof, so that the spring biasing of the disengageable mechanism provides gradual change in resistance to slidable movement of said actuator rod as said end thereof engages said cam section.

3. In wave signal tuning apparatus of the type having a slidably mounted actuator rod with a free end section, the rod being slidable from an initial position to a final position for adjusting resonant circuit means to a fixed frequency and variable means for adjusting the resonant circuit means to a plurality of frequencies, the variable means being interconnected to the resonant circuit means through disengageable mechanism spring biased to a normally closed position, an actuating device for such disengageable mechanism including a slidably mounted plate member with a mechanical link adapted to open the mechanism upon sliding travel thereof, said plate member having a cam portion comprising a straight section terminating in an arcuate section, said straight section of said cam portion being disposed at substantially 15 degrees with respect to the actuator rod so that the end section thereof smoothly engages said straight section in the initial position and said arcuate section in the final position whereby the spring biasing of the disengageable mechanism is imparted to the actuator rod upon movement between said initial and final positions thereof.

4. In wave signal tuning apparatus of the type having movable carriage means for adjusting an associated resonant device and manually operable tuning means coupled by gear reduction means to the carriage means through disengageable mechanism spring biased to a closed position, the push button tuning structure for such apparatus including in combination a slidably mounted plate member with a track thereon, an arm member disposed in the track and adapted to open the disengageable mechanism upon slidable movement thereof, said arm member being spring biased in relation to said plate member, said plate member having a cam section along an edge thereof comprising an inclined portion and an arcuate portion, and a slidably mounted actuator rod having an end in acute angular alignment with said inclined portion of said cam section, said actuator rod being adapted to operate the carriage means upon slidable movement thereof and being slidable from an initial position of engagement with said straight portion of said cam section to a final position of engagement with said arcuate portion thereof, so that the spring biasing of said arm member and the spring biasing of the disengageable mechanism provides gradual change in resistance to slidable movement of said actuator rod as said end thereof engages said cam section.

5. In signal tuner apparatus of the type having a slidably mounted plunger rod with a cam engaging section, the rod being slidable from an initial position to a final position for adjusting tuning elements and variable means interconnected to the tuning elements through a clutch mechanism spring biased to a normally closed position, the actuating device for such clutch mechanism including a slidably mounted member having cooperating means adapted to open the mechanism upon sliding travel thereof, said member having a cam portion comprising an inclined section smoothly blending into a rounded section, said cam portion being positioned with respect to the cam engaging section of the plunger rod so that the cam engaging section contracts said inclined section in the initial position and contacts said rounded section in the final position, whereby the spring biasing of the clutch mechanism is uniformly imparted to the plunger rod as it is operated between said initial and final positions.

References Cited in the file of this patent

UNITED STATES PATENTS 2,346,399 Schwarz et al. ---------- Apr. 11, 1944